US008065489B1

United States Patent
Cummings

(10) Patent No.: US 8,065,489 B1
(45) Date of Patent: Nov. 22, 2011

(54) METHOD AND APPARATUS FOR MANAGING CONCURRENT ACCESS AMONG COMPUTERS TO A BITMAP STORED ON DISK STORAGE

(75) Inventor: Roger John Cummings, Altamonte Springs, FL (US)

(73) Assignee: Symantec Corporation, Mountain View, CA (US)

( * ) Notice: Subject to any disclaimer, the term of this patent is extended or adjusted under 35 U.S.C. 154(b) by 316 days.

(21) Appl. No.: 12/415,484

(22) Filed: Mar. 31, 2009

(51) Int. Cl.
    *G06F 13/00* (2006.01)
(52) U.S. Cl. .......... 711/150; 711/154; 711/161
(58) Field of Classification Search .......... 711/150, 711/154, 161
    See application file for complete search history.

(56) References Cited

U.S. PATENT DOCUMENTS

| 6,195,656 | B1 | 2/2001 | Ozbutun et al. |
| 7,428,658 | B2 | 9/2008 | Nagin et al. |
| 2002/0078239 | A1 | 6/2002 | Howard et al. |
| 2006/0123100 | A1 | 6/2006 | McKenney et al. |
| 2008/0172426 | A1 | 7/2008 | Patel et al. |

Primary Examiner — Yong Choe
(74) Attorney, Agent, or Firm — Wilmer Cutler Pickering Hale and Dorr LLP

(57) ABSTRACT

Method and apparatus for managing concurrent access among computers to a bitmap stored on disk storage. In some examples, a command is received from a requesting computer of the computers, the command indicating that one or more bits in the bitmap are to be cleared. The bitmap as stored on the disk storage is updated responsive to the command to clear the one or more bits in the bitmap. Synchronization data associated with the bitmap is stored. The synchronization data is configured to distinguish between a current generation and a previous generation of the bitmap, and to specify an action to be performed in response to receiving a subsequent command for accessing the bitmap if the subsequent command identifies a previous generation.

20 Claims, 3 Drawing Sheets

METHOD AND APPARATUS FOR MANAGING CONCURRENT ACCESS AMONG COMPUTERS TO A BITMAP STORED ON DISK STORAGE

BACKGROUND OF THE INVENTION

1. Field of the Invention

The present invention relates generally to computer systems. More particularly, the present invention relates to managing concurrent access among computers to a bitmap stored on disk storage.

2. Description of the Related Art

Software applications can be executed across multiple servers, such as a cluster of servers ("distributed applications"). Distributed applications are making increasing use of bitmap structures to track state and control the operation of various features. A number of these bitmap structures can be located on disk storage so that the bitmap data can survive failure of one or more servers. Some bitmaps can be related to the storage on which they reside (e.g., a "dirty" sector list, a mirror resynchronization scoreboard, etc.). Many bitmaps are related to general application features, such as cluster membership and the like. One disadvantage for storing bitmaps on a disk, rather than in memory, is the absence in disk command sets of an equivalent to a "test and set" instruction found in many central processing unit (CPU) command sets. For a number of architectural reasons that have been in place for more than 20 years, disk command sets, such as Advanced Technology Attachment (ATA) and Small Computer System Interface (SCSI) command sets, only support data transfers in a single direction per command. Thus, in order to change the status of a single bit in a bitmap on disk, an application has to read all or a portion of the bitmap structure, change the status of the desired bit, and write the result back to the storage. If during that process another initiator begins a similar process to update a different bit, the state of the bitmap on the disk can become corrupted.

One technique for avoiding corruption of bitmaps stored on a disk shared by multiple computers is to implement a temporary restriction that allows exclusive access from only a single computer (e.g., "write exclusive" access) to the disk for the entire duration of the bitmap update process. However, this technique represents a significant impediment to the operation of a distributed application, given that by definite such an application relies on shared access to disk storage. Such exclusive access can either be established within the distributed application by the use of global locks and/or a designated bitmap manager, or by the use of SCSI Reservations or Persistent Reservations. The former creates a bottleneck and single point of failure within the application, and the latter adds significant overhead to the storage access.

The need to establish exclusive access during a bitmap update can be avoided if a disk command was capable of changing the state of one or more bits in the bitmap structure regardless of the setting of the rest of the structure. This would allow the "read-update-write" cycle to take place within the storage device as an atomic series of actions. However, such a command would solve only part of the problem. While such a command provides a mechanism to set individual bits in a bitmap, there is also a need for an application to be able to clear multiple bits in the bitmap at more infrequent intervals. Presently, such a bitmap clear process still requires exclusive access to be established.

SUMMARY OF THE INVENTION

Aspects of the invention relate to a method, apparatus, and computer readable medium for managing concurrent access among computers to a bitmap stored on disk storage. In some embodiments, a command is received from a requesting computer of the computers, the command indicating that one or more bits in the bitmap are to be cleared. The bitmap as stored on the disk storage is updated responsive to the command to clear the one or more bits in the bitmap. Synchronization data associated with the bitmap is stored. The synchronization data is configured to distinguish between a current generation and a previous generation of the bitmap, and to specify an action to be performed in response to receiving a subsequent command for accessing the bitmap if the subsequent command identifies a previous generation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
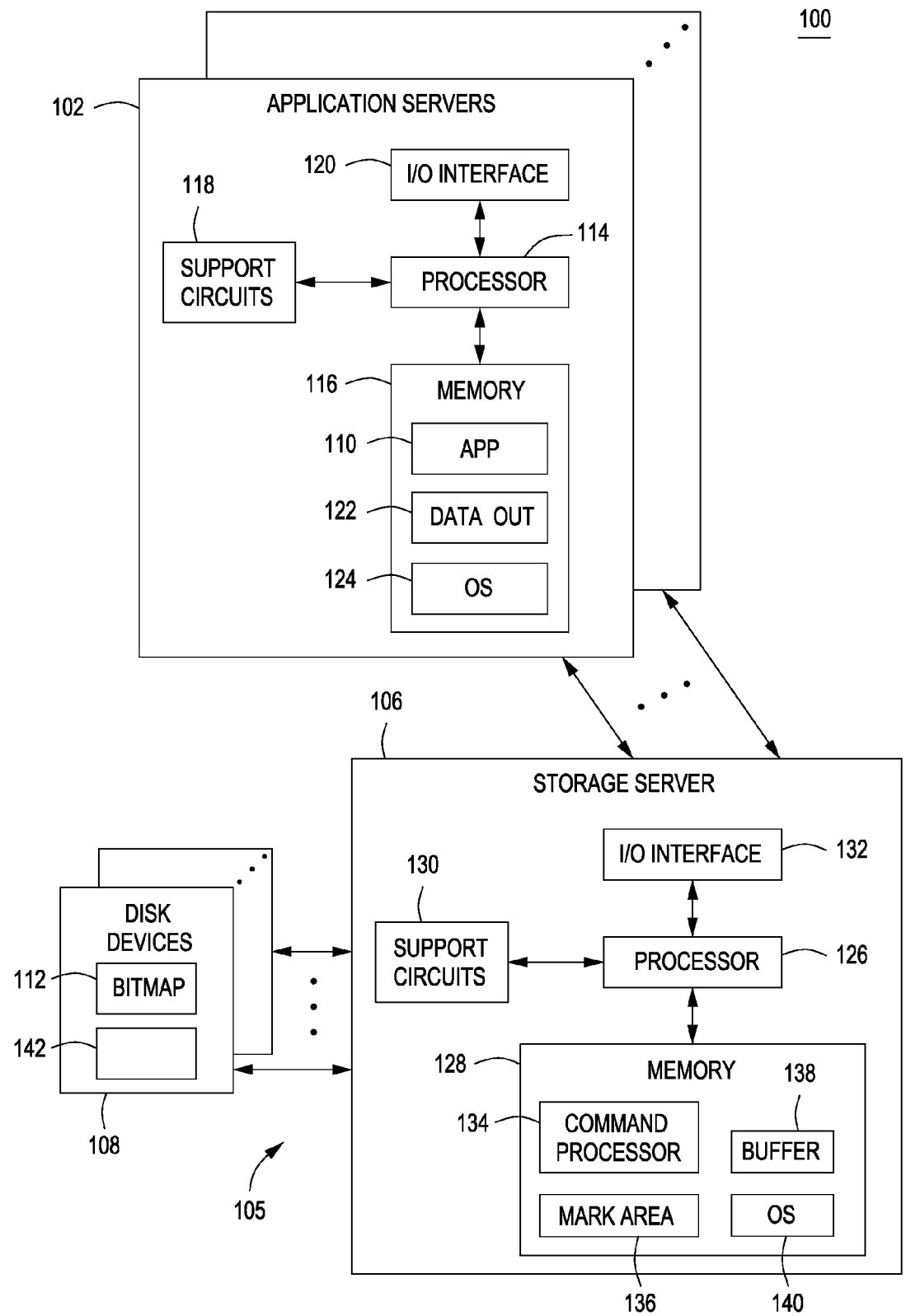
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes application servers 102 and a storage system 105. The storage system 105 includes a storage server 106 and disk devices 108. Logically, the application servers 102 execute an application 110, which makes use of a bitmap 112. The application 110 may be referred to as a "distributed application". In general, a distributed application includes components residing on multiple application servers that combine to provide a specific function. The bitmap 112 can be used to track state of, and control, various features of the application 110. For example, the bitmap 112 may include a bit for each of the application servers 102 the value of which can denote some status of the respective application server vis-à-vis the application 110. Of course, the bitmap 112 can be used to track many other types of information for the application 110. The application servers 102 are configured to store data, including the bitmap 112, in the storage system 105. Each of the disk devices 108 is a storage device capable of storing data in logical blocks. Access to the disk devices 108 is controlled by the storage server 106. In particular, the application servers 102 send commands to the storage server 106 requesting that data be stored to or retrieved from the disk devices 108. The storage server 106 can read from or write to the disk devices 108 based on logical block addresses (LBAs). The storage server 106 may organize the disk devices 108 into various objects, such as redundancy groups, volume sets, and the like.

The computer system 100 may have various physical implementations that perform the aforementioned logical structure. In some embodiments, the application servers 102, storage server 106, and disk devices 108 form all or part of a storage area network (SAN). In some embodiments, each of the application servers 102 may be a computer that includes a processor 114, a memory 116, various support circuits 118, an I/O interface 120. The processor 114 may include one or more microprocessors known in the art. The support circuits 118 for the processor 114 include conventional cache, power supplies, clock circuits, data registers, I/O interfaces, and the like. The I/O interface 120 may be configured for communication to and from devices, including the storage server 106. The I/O interface 120 may be coupled to such other devices by wire, cable, fiber optic, and/or wireless links facilitated by various types of well-known network elements, such as hubs, switches, routers, and the like. The memory 116 may include one or more of the following random access memory, read only memory, magneto-resistive read/write memory, optical read/write memory, cache memory, magnetic read/write memory, and the like.

Each of the application servers 102 is configured to execute software stored in the memory 116 that implements the application 110. Each of the application servers 102 may also include a data-out buffer 122 configured to store data to be written to the storage system 105. In addition, each of the application servers 102 may include an operating system (OS) 124 for executing and managing the application 110.

The storage server 106 may be a computer that includes a processor 126, a memory 128, various support circuits 130, an I/O interface 132. The processor 126 may include one or more microprocessors known in the art. The support circuits 130 for the processor 126 include conventional cache, power supplies, clock circuits, data registers, I/O interfaces, and the like. The I/O interface 132 may be configured for communication to and from devices, including the application servers 102 and the disk devices 108. The I/O interface 132 may be coupled to such other devices by wire, cable, fiber optic, and/or wireless links facilitated by various types of well-known network elements, such as hubs, switches, routers, and the like. The memory 128 may include one or more of the following random access memory, read only memory, magneto-resistive read/write memory, optical read/write memory, cache memory, magnetic read/write memory, and the like. The storage server 106 is configured to execute software stored in the memory 128 for processing commands from the application servers 102 ("command processor 134"). The command processor 134 manages a mask area 136 and a buffer 138 in the memory 128. The storage server 106 may also include an OS 140 for managing and controlling the disk devices 108 and access thereto. The command processor 134 may be part of the OS 140, or may be a separate application running on the OS 140.

Each of the disk devices 108 may include one or more block-based storage devices, such as hard-disk drives. The disk devices 108 are managed and organized by the storage server 106. At least one of the disk devices 108 may store bitmap data for the application 110. In the present example, the bitmap 112 is shown as being stored in one of the disk devices 108. The bitmap 112 may be stored in one or more logical blocks. As described below, disk device(s) 108 may store state information 142 associated with the bitmap 112. The state information 142 may include a current generation identifier, a previous generation identifier, and a previous generation handling (PGH) code, as described in more detail below. The current generation identifier, the previous generation identifier, and the PGH code in the state information 142 may be referred to as "synchronization data."

In operation, the application servers 102 under control of the application 110 are configured to selectively set bits in the bitmap 112 by sending commands to the storage server 106. By "set" it is meant that the value of a bit in the bitmap 112 is a predefined active value (e.g., logical '1'). An unset or "cleared" bit has the opposite value (e.g., logical '0'). A command configured to set or clear individual bits of data in one or more logical blocks stored in the storage system 105 is referred to herein as an BitmapSetClear command. Thus, to set or clear bits in the bitmap 112, an application server 102 may issue an BitmapSetClear command to the storage server 106. The command processor 134 processes the BitmapSetClear command to set or clear bit(s) in the bitmap 112 accordingly. The command processor 134 executes an BitmapSetClear command from a particular application server 102 atomically. When clearing bit(s) in the bitmap 112, the BitmapSetClear command includes a mechanism for providing a synchronization point so that subsequent commands do not corrupt the bitmap 112. The atomicity of the BitmapSetClear command in combination with the synchronization mechanism in access to the bitmap 112 obviates the need to establish exclusive access to the bitmap 112 for a particular application server 102 when setting or clearing bit(s). The disadvantages of an exclusive access mechanism are set forth above.

Figure 2:
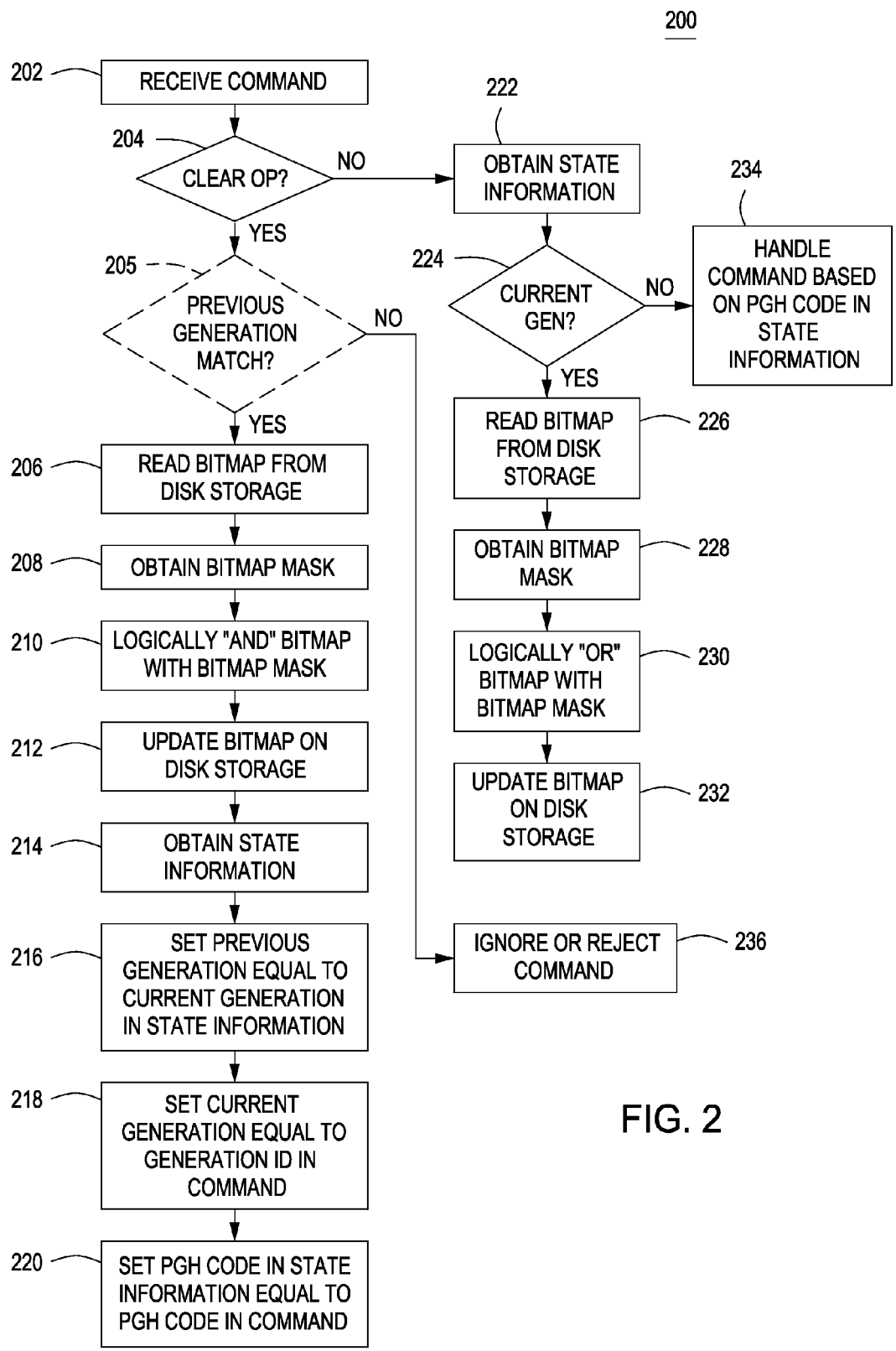
FIG. 2 is a block diagram depicting a method of managing concurrent access to a bitmap among a plurality of computers implementing a distributed application according to some embodiments of the invention.

FIG. 2 is a block diagram depicting a method 200 of managing concurrent access to a bitmap among a plurality of computers implementing a distributed application according to some embodiments of the invention. In some embodiments, the method 200 may be implemented by the storage server 106 of FIG. 1, e.g., by the command processor 134, to manage concurrent access to the bitmap 112 among the application servers 102 implementing the application 110. For purposes of clarity by example, the method 200 is described with reference to the elements of the computer system 100 shown in FIG. 1.

The method 200 begins at step 202, wherein the storage server 106 receives a command to modify the bitmap 112. For example, the storage server 106 may receive an BitmapSetClear command from one of the application servers 102 (referred to as the "requesting application server").

Figure 3:
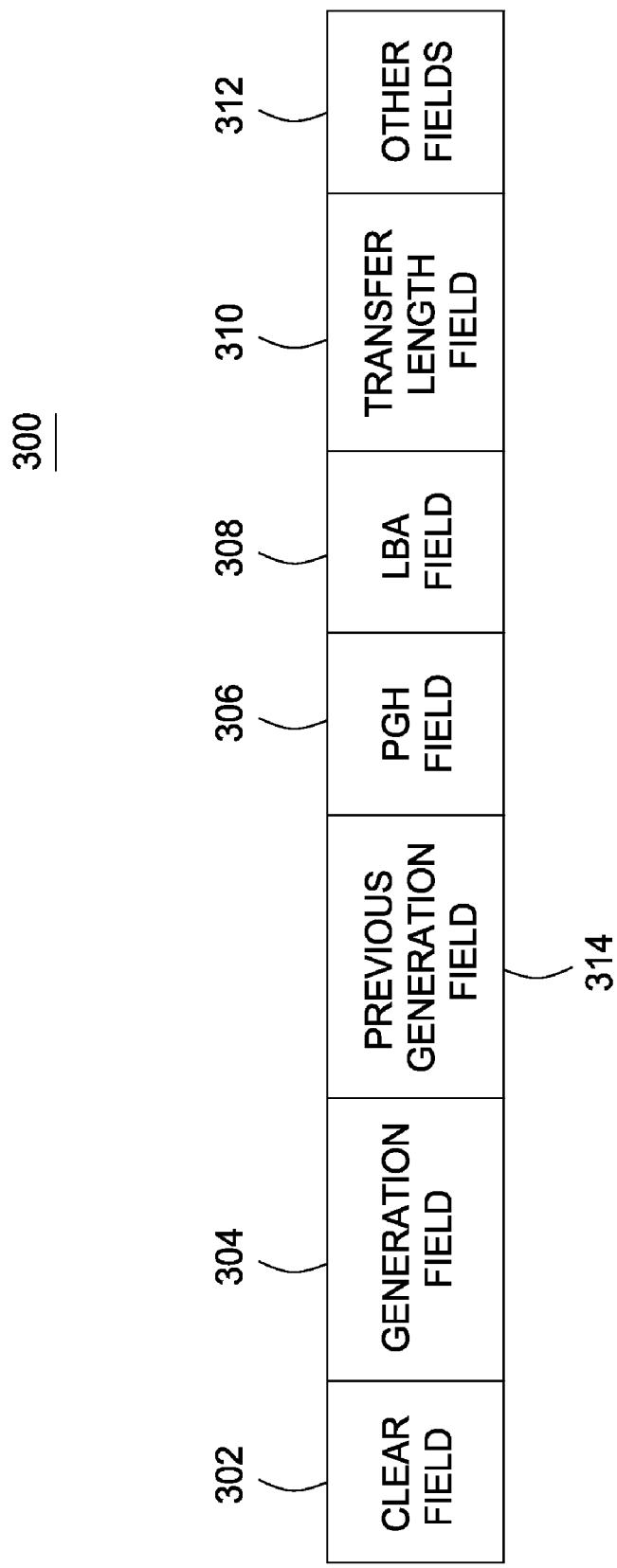
FIG. 3 is a block diagram depicting structure of an BitmapSetClear command according to some embodiments of the invention.

FIG. 3 is a block diagram depicting structure of an BitmapSetClear command 300 according to some embodiments of the invention. The command 300 generally includes a plurality of fields. A "field" in the command 300 may include one or more bits. Notably, the command 300 includes a clear field 302, a generation field 304, a previous generation handing (PGH) field 306, an LBA field 308, a transfer length field 310, and one or more other fields 312. The depiction of the command 300 in FIG. 3 is not meant to convey any particular order of the fields therein. The clear field 302 may comprise a single-bit field that is used to indicate whether data bit(s) referenced by the command should be cleared. The generation field 304 may include one or more bits that represent a current generation identifier. The PGH field 306 may include one or more bits that represent a code that indicates how commands with a previous generation identifier should be handled. There may be one or more different ways to handle commands with previous generation identifiers, each having a different code. The LBA field 308 includes a plurality of bits that represent an LBA for the data to be read in the storage. The transfer length field 310 includes a plurality of bits that represent the number of logical blocks of data to be read from storage. The other field(s) 312 may include various other fields, such as opcode, control, and like type fields. For purposes of clarity, the details of such additional field(s) are omitted. In some embodiments, the command 300 may optionally include a previous generation field 314. The previous generation field may comprise one or more bits that represent a previous generation identifier, which can be used as described below.

Returning to FIG. 2, the BitmapSetClear command received at step 202 may include an LBA field 308 and transfer length field 310 for reading the bitmap 112 from the storage system 105. At step 204, a determination is made whether the command indicates a clear operation. For example, the storage server 106 may check the value of the clear field 302. If a clear operation is invoked, the method 200 proceeds to step 206 or optionally step 205. Otherwise, the method proceeds to step 222.

In some embodiments, if a clear operation is invoked, the method 200 proceeds to step 205. At step 205, a determination is made whether a previous generation identifier in the command is equal to a previous generation identifier in the state information 142. If so, the method 200 proceeds to step 206. Otherwise, the method 200 proceeds to step 236, where the command is ignored (e.g., a no operation) or rejected.

At step 206, the storage server 106 reads logical block(s) specified by the command from the disk device(s) 108. In this manner, the storage server 106 may obtain the bitmap 112 as stored on the disk device(s) 108. At step 208, the storage server 106 obtains logical block(s) that include a bitmap mask. The bitmap mask indicates which bit(s) in the bitmap 112 are to be cleared (e.g., the mask may include logical '0' for each bit to be cleared, and logical '1' otherwise). The requesting application server 102 may send the bitmap mask as part of the same transaction that includes the BitmapSetClear command. The transfer length field 310 can define the size of the bitmap mask. The logical block(s) that include the bitmap mask may be transferred from the data-out buffer 122 in the requesting application server 102.

At step 210, the storage server 106 performs a logical AND operation with the logical block(s) of the bitmap 112 and the logical block(s) of the bitmap mask. In some embodiments, the storage server 106 may perform the AND operation in the mask area 136. The result of the AND operation is the bitmap 112 with one or more selected bits having been cleared. The logical block(s) of the AND operation result can be stored in the buffer 138. At step 212, the storage server 106 writes the logical block(s) of the AND operation result to the disk device(s) 108 to update the bitmap 112. Steps 206 through 212 generally perform a process for updating the bitmap as stored on the disk storage responsive to the command to clear the one or more bits in the bitmap.

At step 214, the storage server 106 obtains state information for the bitmap 112. In some embodiments, the state information may be stored in the memory 128 of the storage server 106. In some embodiments, the state information 142 may be stored in the disk device(s) 108. At step 216, the storage server 106 sets a previous generation identifier in the state information 142 equal to a current generation identifier in the state information 142. At step 218, the storage server 106 sets the current generation identifier in the state information 142 equal to the generation identifier as set forth in the command. At step 220, the storage server 106 sets a PGH code in the state information 142 equal to the PGH code from the command. The current generation identifier, the previous generation identifier, and the PGH code in the state information 142 may be referred to as "synchronization data." Note that the synchronization data may include multiple previous generation identifiers to indicate several previous generations. In order to avoid potential corruption of the bitmap 112, steps 206 through 220 must be performed atomically (i.e., before another command from an application server 102 is processed).

If the command does not indicate a clear operation, the method 200 proceeds to step 222. At step 222, the storage server 106 obtains the state information 142 for the bitmap 112. At step 224, the storage server 106 determines whether the generation identifier in the command is the same as the identifier for the current generation in the state information 142. If so, the method 200 proceeds to step 226. Otherwise, the method 200 proceeds to step 234

At step 226, the storage server 106 reads logical block(s) specified by the command from the disk device(s) 108. In this manner, the storage server 106 may obtain the bitmap 112. At step 228, the storage server 106 obtains logical block(s) that include a bitmap mask. The bitmap mask indicates which bit(s) in the bitmap 112 are to be set (e.g., the mask may include logical '1' for each bit to be set, and logical '0' otherwise). The requesting application server 102 may send the bitmap mask as part of the same transaction that includes the BitmapSetClear command. The transfer length field 310 can define the size of the bitmap mask. The logical block(s) that include the bitmap mask may be stored in the data-out buffer 122 in the requesting application server 102.

At step 232, the storage server 106 performs a logical OR operation with the logical block(s) of the bitmap 112 and the logical block(s) of the bitmap mask. In some embodiments, the storage server 106 may perform the OR operation in the mask area 136. The result of the OR operation is the bitmap 112 with one or more selected bits having been set. The logical block(s) of the OR operation result can be stored in the buffer 138. At step 234, the storage server 106 writes the logical block(s) of the OR operation result to the disk device(s) 108 to update the bitmap 112. Steps 228 through 234 generally perform a process for updating the bitmap as stored on the disk storage responsive to the command to set the one or more bits in the bitmap.

If at step 224 the generation identifier in the command is not the same as the identifier for the current generation in the state information 142, the method 200 proceeds to step 234 At step 234 the storage server 106 handles the command according to the PGH code set forth in the state information 142. The storage server 106 may take various actions depending on the PGH code in the state information 142. For example, the storage server 106 can handle the command as normal (e.g., execute steps 228-234 above. Alternatively, the storage server 106 can handle the command as a no operation (NOP) and do nothing. In another alternative, the storage server 106 can stop execution of the command and send an indication of such to the requesting application server 102. In order to avoid potential corruption of the bitmap 112, steps 222 through 234 must be performed atomically (i.e., before another command from an application server 102 is processed).

By establishing and tracking identifiers for the current generation and previous generation(s), the storage server 106 can establish a synchronization point in access to the bitmap 112 among the application servers 102. If an application server 102 sends a command identifying the current generation, then storage server 106 processes the command normally to set bit(s) in the bitmap 112. If an application server 102 sends a command with a previous generation identifier, then the storage server 106 can perform special handling of the command. For example, the storage server 106 can perform a NOP and optionally send an indication of such the requesting application server 102. In this manner, the storage server 106 can avoid corrupting the bitmap 112 based on a bitmap mask that assumed a previous version of the bitmap 112 (e.g., a version before the bitmap 112 was cleared).

The method 200 may be repeated for subsequent commands from the application servers 102. In general, a first command may be received indicating that one or more bits in the bitmap 112 are to be cleared. The storage server 106 may update the bitmap 112 stored on the disk device(s) 108 to update the bitmap accordingly. The storage server 106 also stores synchronization data for the bitmap 112 in the state information 142 that distinguishes between the current generation and a previous generation, as well as indicating an action to be taken if a subsequent command identifies a previous generation. Then, a subsequent command can be received. If the subsequent command is a set command that identifies the current generation, the storage server 106 sets one or more bits thereof accordingly. If the subsequent command identifies a previous generation, then the storage server 106 takes the designated action as set forth in the synchronization data.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of managing concurrent access among computers to a bitmap stored on disk storage, comprising:
   receiving a command from a requesting computer of the computers, the command indicating that one or more bits in the bitmap are to be cleared;
   updating the bitmap as stored on the disk storage responsive to the command to clear the one or more bits in the bitmap; and
   storing synchronization data associated with the bitmap, the synchronization data configured to distinguish between a current generation and a previous generation of the bitmap, and to specify an action to be performed in response to receiving a subsequent command for accessing the bitmap if the subsequent command identifies the previous generation.

2. The method of claim 1, wherein the command includes a clear field, a generation field, and a previous generation handling field, where the clear field indicates a clear function.

3. The method of claim 2, wherein the synchronization data comprises a current generation identifier, a previous generation identifier, and a previous generation handling code, and wherein the step of storing comprises:
   setting the previous generation identifier equal to the current generation identifier;
   setting the current generation identifier equal to an identifier in the generation field of the command; and
   setting the previous generation handling code equal to a code in the previous generation handling field in the command.

4. The method of claim 1, wherein the step of updating comprises:
   reading the bitmap from the disk storage;
   obtaining a bitmap mask from the requesting computer;
   performing a logical AND operation with the bitmap and the bitmap mask; and
   updating the bitmap as stored on the disk storage with a result of the logical AND operation.

5. The method of claim 1, further comprising:
   receiving the subsequent command from one of the computers for accessing the bitmap, the subsequent command identifying the previous generation;
   performing the action as specified in the synchronization data in response to the subsequent command.

6. The method of claim 5, wherein the action includes performing no operation.

7. The method of claim 1, further comprising:
   receiving the subsequent command from one of the computers for accessing the bitmap, the subsequent command identifying the current generation; and
   updating the bitmap as stored on the disk storage responsive to the subsequent command to modify one or more bits in the bitmap.

8. An apparatus for managing concurrent access among computers to a bitmap stored on disk storage, comprising:
   means for receiving a command from a requesting computer of the computers, the command indicating that one or more bits in the bitmap are to be cleared;
   means for updating the bitmap as stored on the disk storage responsive to the command to clear the one or more bits in the bitmap; and
   means for storing synchronization data associated with the bitmap, the synchronization data configured to distinguish between a current generation and a previous generation of the bitmap, and to specify an action to be performed in response to receiving a subsequent command for accessing the bitmap if the subsequent command identifies the previous generation.

9. The apparatus of claim 8, wherein the command includes a clear field, a generation field, and a previous generation handling field, where the clear field indicates a clear function.

10. The apparatus of claim 9, wherein the synchronization data comprises a current generation identifier, a previous generation identifier, and a previous generation handling code, and wherein the means for storing comprises:
    means for setting the previous generation identifier equal to the current generation identifier;
    means for setting the current generation identifier equal to an identifier in the generation field of the command; and
    means for setting the previous generation handling code equal to a code in the previous generation handling field in the command.

11. The apparatus of claim 8, wherein the means for updating comprises:
    means for reading the bitmap from the disk storage;
    means for obtaining a bitmap mask from the requesting computer;
    means for performing a logical AND operation with the bitmap and the bitmap mask; and
    means for updating the bitmap as stored on the disk storage with a result of the logical AND operation.

12. The apparatus of claim 8, further comprising:
    means for receiving the subsequent command from one of the computers for accessing the bitmap, the subsequent command identifying the previous generation;

means for performing the action as specified in the synchronization data in response to the subsequent command.

13. The apparatus of claim 12, wherein the action includes performing no operation.

14. A computer readable medium having stored thereon instructions that when executed by a processor cause the processor to perform a method of managing concurrent access among computers to a bitmap stored on disk storage, comprising:
- receiving a command from a requesting computer of the computers, the command indicating that one or more bits in the bitmap are to be cleared;
- updating the bitmap as stored on the disk storage responsive to the command to clear the one or more bits in the bitmap; and
- storing synchronization data associated with the bitmap, the synchronization data configured to distinguish between a current generation and a previous generation of the bitmap, and to specify an action to be performed in response to receiving a subsequent command for accessing the bitmap if the subsequent command identifies the previous generation.

15. The computer readable medium of claim 14, wherein the command includes a clear field, a generation field, and a previous generation handling field, where the clear field indicates a clear function.

16. The computer readable medium of claim 15, wherein the synchronization data comprises a current generation identifier, a previous generation identifier, and a previous generation handling code, and wherein the step of storing comprises:
- setting the previous generation identifier equal to the current generation identifier;
- setting the current generation identifier equal to an identifier in the generation field of the command; and
- setting the previous generation handling code equal to a code in the previous generation handling field in the command.

17. The computer readable medium of claim 14, wherein the step of updating comprises:
- reading the bitmap from the disk storage;
- obtaining a bitmap mask from the requesting computer;
- performing a logical AND operation with the bitmap and the bitmap mask; and
- updating the bitmap as stored on the disk storage with a result of the logical AND operation.

18. The computer readable medium of claim 14, further comprising:
- receiving the subsequent command from one of the computers for accessing the bitmap, the subsequent command identifying the previous generation;
- performing the action as specified in the synchronization data in response to the subsequent command.

19. The computer readable medium of claim 18, wherein the action includes performing no operation.

20. The computer readable medium of claim 14, further comprising:
- receiving the subsequent command from one of the computers for accessing the bitmap, the subsequent command identifying the current generation; and
- updating the bitmap as stored on the disk storage responsive to the subsequent command to modify one or more bits in the bitmap.

* * * * *